A. GREELEY.
Saw-Setting Devices.
No. 133,982. Patented Dec. 17, 1872.
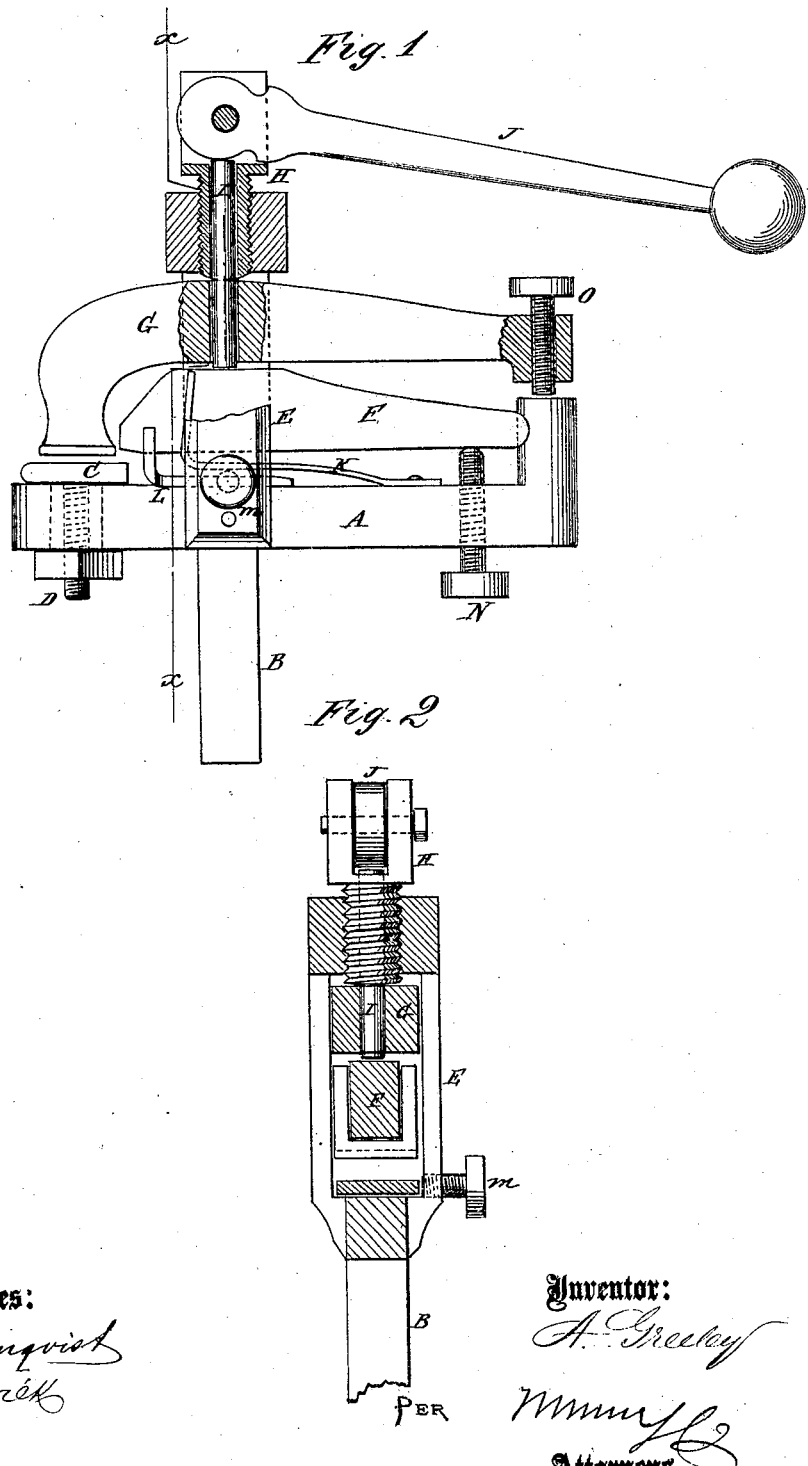

UNITED STATES PATENT OFFICE.

ALEXANDER GREELEY, OF STEPHENSVILLE, WISCONSIN.

IMPROVEMENT IN SAW-SETTING DEVICES.

Specification forming part of Letters Patent No. 133,982, dated December 17, 1872.

*To all whom it may concern:*

Be it known that I, ALEXANDER GREELEY, of Stephensville, in the county of Outagamie and State of Wisconsin, have invented a new and useful Improvement in Saw-Sets, of which the following is a specification:

The object of this invention is to furnish an apparatus for setting the teeth of saws which shall be more useful than the saw-sets heretofore made; and it consists in the construction and arrangement of parts hereinafter described.

In the accompanying drawing, Figure 1 represents a side view of the saw-set, partly in section; and Fig. 2 is a vertical section of Fig. 1 taken on the line $x\,x$.

Similar letters of reference indicate corresponding parts.

A is the bed-piece, having upon its under side a shank, B, by which the saw-set is attached to a bench or table. C is a plate upon which the saw is laid, made adjustable on and secured to the bed by the screw D. E is a vertical column, attached at its lower end to the bed, which is mortised out above the bed. F is the jaw, which is made to operate directly on the saw-teeth. G is the clamp-bar for clamping the saw-plate. H is a screw which works in the top of the column E, by which the clamp-bar is forced down as the end of the screw bears upon the top of the bar when the screw is turned down, as seen in the drawing. I is a loose rod which passes through the center of the screw and through the clamp-bar, with its end resting on the top of the jaw F. J is a cam-lever pivoted on the top of the screw. When the lever is raised the rod I is forced down by the cam, and operates on the jaw F. The back motion of the jaw is produced by the spring K. The forward end of this spring is divided, so that a part passes up on each side of the jaw, with their ends bearing against the under side of the clamp-bar, and holding that bar up from the plate C when the saw is withdrawn. L is a gage, made adjustable by means of the thumb-screw $m$ for governing the position of the saw on the plate C. N is a thumb-screw for adjusting the jaw F, and O is a screw for adjusting the clamp-bar G. By means of these screws the jaw and the clamp-bar are adjusted to saws of different thickness, so that the action of the cam will be uniform at all times.

When a saw is placed upon the plate C the clamp-bar is forced down to the saw-plate by turning round the lever and screw H. The teeth of the saw will strike the guide or gage L, and the plate C may be so adjusted that the point only of the tooth will receive the jaw. The saw-set is therefore adapted to very fine as well as coarse toothed saws. The teeth of the saw are set or bent by raising the cam-lever and forcing down the jaw F, as before stated.

Having thus described my invention, I claim as new and desire to secure by Letters Patent—

1. A saw-set, composed of the bed A, column E, jaw F, clamp-bar G, adjustable plate C, rod I, screw H, and cam-lever J, arranged to operate substantially as described.

2. In combination with the jaw F and clamp-bar G, the adjusting-screws N and O, substantially as described.

3. The spring K, combined with the jaws F G, as and for the purpose described.

ALEXANDER GREELEY.

Witnesses:
HORATIO HOUTH,
JOHN H. JENNY.